United States Patent Office 3,522,329
Patented July 28, 1970

3,522,329
COMPOSITION COMPRISING POLYESTER AND POLYETHER-POLYAMIDE BLOCKCOPOLYMER
Kaoru Okazaki and Asaharu Nakagawa, both of 8 Denji-yama, Narumi-cho, Midori-ku, Nagoya, Japan; Yoshi-mitsu Ichikawa, 2-27 Bunkyo-cho, Mishima-shi, Shizuoka-ken, Japan; and Yuzaburo Nakayama, 8 Denji-yama, Narumi-cho, Midori-ku, Nagoya, Japan
No Drawing. Filed Feb. 6, 1968, Ser. No. 703,243
Int. Cl. C08g 41/04
U.S. Cl. 260—857          5 Claims

ABSTRACT OF THE DISCLOSURE

Synthetic resinous compositions improved as to deficiencies of polyesters such as frictional static charge accumulation and poor hygroscopicity can be obtained by blending polyesters with block copolymers in which polyether is bonded with polyamide in linear linkage.

Better results are obtainable by using block-copolymer containing polyether segments in such large amounts that they occupy 0.05–20% of the total blend composition.

Compositions can be used for fibers, films, shaped articles, and it is particularly preferable to use them as one component of composite filaments.

This invention relates to a useful synthetic resin composition which concurrently possesses the excellent properties of both polyester and polyamide but is free from the deficiencies in said polymers, and also to a process for the preparation of shaped articles from that composition.

Among the synthetic fibers produced on industrial scales at present, polyester fibers which is mainly composed of polyethylene terephthalate and polyamide fibers mainly composed of nylon-6 have received particularly wide acceptance, because of their excellent properties.

However, the polyester fibers have such drawbacks as poor dyeability and excessively high Young's modulus (initial modulus). A high initial modulus is objectionable in that it causes poor drapability of the fabric prepared from the fibers.

The polyamide fibers, on the other hand, have an excessively low initial modulus which causes low stiffness.

Furthermore, a common and important drawback in the two fibers is that they are apt to accumulate electrostatic charge.

Still another drawback is that both fibers possess little hygroscopicity, which imposes a serious limitataion on their clothing usage.

Accordingly, it is apparent that if a resinous composition could be invented which is free from the foregoing drawbacks, interalia, the static charge accumulation, while retaining the excellent properties of the polyester and polyamide, the shaped articles prepared therefrom such as fibers and films will have very high commercial value.

Therefore, the object of this invention is to provide a resinous composition which gives the novel shaped articles including fibers having the above-described characteristics, as well as a process for the preparation of such shaped articles from the composition.

Concerning the improvement of polyesters as to their static charge accumulation, various attempts have been made in the past, which can be crudely classified into three types.

The first group employs various after treatments. For example, German Pat. No. 1,154,268 proposed a quaternary ammonium salt treatment of the synthetic fibers, and Japanese patent application, Publication No. 14,650/64 disclosed an aqueous polyethyleneimine treatment of polyester fibers.

The second group employs copolymerization method, among which Japanese patent application, Publication No. 346/63 proposed copolymerization of N,N'-piperazyne dicarboxylic acid with polyester, and Hungarian Pat. No. 150,851 copolymerized alkyl glycidyl ether with polyester.

The third group employs "blending" method. For example, Japanese patent application, Publication No. 5214/64 proposed blending or mixing of high molecular polyalkylene glycol with polyester prior to the spinning.

However, each of the foregoing methods has its own deficiencies and is unsatisfactory for industrial scale practice. For instance, in the after-treatment methods the antistatic agent adheres only to the surfaces of the fibers, and which tend to be removed by washing. Thus a permanent antistatic effect cannot be obtained, although the method may appear temporarily effective. Also the after treatment normally appreciably impair the feeling or handling of the product, because they apply surface coating of antistatic resin to the fibers.

Also the attempts to achieve sufficient antistatic effect by the copolymerization or blending methods in most cases invited degradation in advantageous physical properties of the polyester or objectionable coloring of the product. Thus none of the methods have proved to be satisfactory for practical use.

Likewise, numbers of proposals have been made to improve the dyeability of the polyester, among which the blending of the polyester with polyamide is well known as a method for producing fibers which have improved dyeability as well as adequate initial modulus. According to that method, the initial modulus of the blended composition can be optionally controlled to a value between the initial moduli of pure polyester and polyamide by adjusting their blending ratio, and an affinity to acid dyes can be imparted to the polyester composition. However, the insufficient interfacial bonding of the two materials due to their poor compatibility tends to cause slippage, which results in the insufficient strength of the product. Also because of the unique flow properties or behavior of the blended composition, the spun filaments therefrom have denier unevenness. This seriously impairs the product quality.

We had vigorously pursued the research works for improving the properties of polyester and polyamide, and successfully prepared a synthetic resin composition which gives the shaped articles including fibers which are substantially free from the foregoing drawbacks but retain the excellent properties inherent in the said polymers.

Briefly stated, the present invention comprises a blended composition obtained by mixing a polyether-polyamide-blockcopolymer with a polyester polymer, and the process for the preparation of shaped articles from the composition.

The melt-spinning or molding of the blended composition provides shaped articles such as staple, filament, composite filament, film, bristle, molded materials, etc., which have excellent dyeability and hygroscopicity, a suitable initial modulus, and a permanent antistatic property.

The polyester polymers which are useful for this invention are high molecular, linear polyesters, particularly those containing aromatic ring or rings. For example, polyethylene terephthalate and polyester of p-oxyethoxy-benzoic acid are preferred. It is also permissible to use more than one polyester components.

Furthermore, one or more of copolymerizable or blendable components other than polyester may be present, so far as their presence is not detrimental to the polyester characteristics.

Among such components, particularly a modified polyester polymer such as polyester-polyamide blockcopolymer in which the polyester and polyamide components are block copolymerized is preferred in this invention, the polyamide content of the blockcopolymer being at most 30 percent by weight.

The "polyether-polyamide blockcopolymer" refers to a blockcopolymer in which the polyether segments and polyamide segments are bonded to form a straight chain. Such a blockcopolymer per se is of course known.

The blockcopolymer can be prepared by any of the following methods, A–C.

(A) Polycondensaiton of a polyamide-forming monomer (e.g., lactams, ω-amino acids, or combination of diamines with dicarboxylic acids) in the presence of a polyether having amino groups at the ends or an organic acid salt thereof.

(B) Polycondensation of a polyamide-forming monomer (e.g., lactams, ω-amino acids, or a nylon salt of diamines and dicarboxylic acids) in the presence of a polyether having carboxyl groups at the ends or an organic amine salt thereof.

(C) Polycondensation of a polyether having amino groups, carboxyl groups, or an amino and carboxyl groups at the ends, with a polyamide oligomer of which two ends are carboxyl groups (when the polyether has at least one end amino group), or amino groups (when the polyether has at least one end carboxyl group), or an amino group and carboxyl group, in solution or melt form.

The blockcopolymer used in this invention may also be prepared by a suitable combination of the foregoing methods, or any other known method, but the method A in the above is the most preferred. Particularly it is advantageous to heat a polyamide-forming monomer (e.g. lactams, ω-amino acids, or nylon salt of diamines and dicarboxylic acids) to 200–270° C. in the presence of an organic acid salt of A which is composed of a polyether having amino end groups and an aliphatic or aromatic dicarboxylic acid, to bring about their polycondensation.

As the lactams, those represented by the formula:

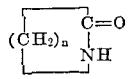

wherein $n$ is 5–11 are conveniently used.

As the ω-amino acids, 6-aminocaproic, 9-aminononanoic, 10-aminocapric, and 11-aminoundecanoic acids and the like are conveniently used.

Furthermore, preferred combinations of diamines with dicarboxylic acids include: hexamethylene diamine or m-xylylenediamine with adipic, sebacic, suberic or isophthalic acid.

In the above methods A through C, polyalkylene oxides such as polyethylene, polypropylene, polybutylene and polytetramethylene oxides, and the copolymers of these alkyene oxides are advantageously used as the polyether, the most preferred being polyethylene oxide.

In order to impart a prolonged antistatic effect to a shaped article, the polyether segment content to the total weight of the polyester and the block copolymer, which are present in the article in a blended state, must be at least 0.50%.

The greater is the polyether segment content, the higher becomes the antistatic effect, but spinnability and drawability of the composition are lowered. Therefore, an excessively high polyether segment content is detrimental to the purpose of this invention.

It will be demonstrated in the later appearing Table 2 in Example 1, that when the polyether segment content exceeds 5 wt. percent, the strength of the product fiber is slightly lowered; if it exceeds 10 wt. percent, the strength lowering tendency becomes more conspicuous; when it exceeds 20 wt. percent, the spinnability becomes poor, and the drawing of the undrawn filaments becomes difficult.

Likewise, there are certain preferred ranges for the sequence length of the polyether segment and the content of the polyether segment in the blockcopolymer.

It was found that blockcopolymers of high polyether segment contents achieve surprisingly good results according to this invention, while if such a copolymer alone is used as the starting material of a shaped article, the product could hardly maintain satisfactory physical properties due to the high polyether content.

Similarly, such a blockcopolymer which, if used alone, will seriously impair the properties of the product due to the excessively long polyether segments, was found to give shaped articles of surprisingly good properties, if used in accordance with this invention.

Accordingly, the blockcopolymers which contain at most 85 wt. percent, preferably 20–60 wt. percent, of polyether segments are advantageously used in this invention.

If the polyether segment content exceeds 85 wt. percent, the solubility of the blockcopolymer in water or organic solvents increases. Therefore the copolymer is extracted and removed during the after treatments or actual usage. Then of course the improved properties imparted by the blockcopolymer are lost.

Furthermore, in the preferred blockcopolymer, each polyether segment contains 20–180, preferably 45–150, oxygen atoms.

The sequence length of the polyether segments in the polyether-polyamide blockcopolymer can be controlled by suitably selecting the number average molecular weight of the starting polyether having amino or carboxyl end groups. Normally the polyethers of number average molecular weight of approximately 1,000 or above, preferably 2,000 or above, are used.

The blockcopolymer may contain other copolymerizable component or components in an amount as will not impair the essential properties of the copolymer.

It is indeed surprising that according to this invention, such a polyether-polyamide blockcopolymer which, if used alone, would not exhibit the preferred mechanical porperties of polyamide, is blended with polyester to produce a composition which retains the preferred properties of both polyamide and polyester and still has an improved antistatic property of a practically valuable level. Furthermore, the improvement is of a permanent nature. Such is a truly an unexpected effect.

The blending method of the polyester and the polyether-polyamide blockcopolymer is not critical. For example, it can be accomplished by any of the following methods.

(1) The two polymer chips are well mixed, and the mixture is converted into fibrous or shaped articles according to the accepted practice, using a conventional melt-spinning or molding machine.

(2) The polymers are separately melted, and blended in the molten state.

(3) A solid mixture of the two polymers is melt-blended in a conventional extruder to form chips or pellets, which are then converted into fibrous or shaped articles by means of a conventional melt-spinning or molding machine.

The composition of this invention can be converted into filaments and staple by melt-spinning. It is also possible to use the composition as a component of composite filament.

In the blending or melt-molding of the polyester and polyether-polyamide blockcopolymer, exposure of the polymers under melting conditions to a prolonged or severe blending should be avoided, so as to prevent the occurrence of an ester-amide interchange reaction to noticeable degree.

If an excessive blending under melting condition is continued over a long period to allow the esteramide interchange reaction to proceed freely in the blend, in an extreme case a random copolymer of the polyamide and polyester is formed. Such a copolymer no more possesses the inherent properties of the polyester of polyamide, and exhibits no antistatic property.

The blending ratio is so selected that after the blending, the polyether segment content in the polyether-polyamide blockcopolymer should be 0.05–20%, preferably 0.05–10%, inter alia, 0.05–5%, to the weight of the entire system.

It is also permissible to add a minor amount of other polymer or polymers such as polyamide, polycarbonate and polyolefin to the system, so far as the addition does not impair the polyester properties.

Again known additives which are conventionally employed in this field of art, such as a viscosity stabilizer, delusterant, heat-resisting agent, weather-resisting agent, sunlight-resisting agent, dyestuffs, pigments, plasticizers and fillers, may be added to the system.

Hereinafter the invention will be explained with reference to following examples, it being understood that the same are merely intended in an illustrative sense, and the invention should not be limited thereby.

Also the measuring methods employed to obtain the measured values given in the examples will be briefly explained herein.

(1) Measurement of frictionally charged voltage

A test sample (knit piece of the filaments) is set on the rotary portion of a rotary static meter and rotated at a constant rate to cause friction between the test sample and a standard wool texture. Then the electrostatic charge accumulated on the sample is measured. Testing conditions: 20° C., 65% RH.

(2) Dye absorption

A test sample is dyed with Xylene Fast Blue PR (color index: acid blue 129) which is an acid dye, under the following conditions, and the dye absorption is determined from the difference in the concentrations of the dye solution before and after the dyeing.

Dyeing conditions:
   Dyestuff 2% (to the total weight of filaments)
   Acetic acid 3% (to the total weight of filaments)
   Bath ratio 1:100

60 minutes at 98° C.

$$\text{Dye absorption } (\%) = \frac{A_0 - A}{A_0} \times 100$$

$A_0$ = absorbance of the dye solution before dyeing
$A$ = absorbance of the dye solution after dyeing (3) Uster unevenness U percentage is measured with an Uster Evenness Tester. The less the percentile value, the less the denier unevenness. This provides one norm for judging the spinning condition.

(4) Crimp recovery

This value is calculated from the formula below:

$$\text{Crimp recovery } (\%) = \frac{L_1 - L_2}{L_1 - L_0} \times 100$$

$L_0$ = length of the crimped fiber (test sample) when a load of 3 mg./d. is exerted thereto.

$L_1$ = length of the crimped fiber when a load of 50 mg./d. is exerted thereto.

$L_2$ = length of the crimped fiber when first a load of 50 mg./d. is exerted and then the load is reduced to 3 mg./d.

(5) Number of convolution

Number of crimps present in 25 mm. length of the fiber which is under a load of 3 mg./d.

(6) Percentage crimp

This is determined from the formula below.

$$\text{Percentage crimp} = \frac{L_1 - L_0}{L_1} \times 100 (\%)$$

(7) Solution viscosity (a) The relative viscosity shall be hereinafter referred to as $\eta(r)$ is measured at 25° C. as to a solution of 100 ml. of m-cresol containing 1 g. of the test sample.

(b) The intrinsic viscosity shall be hereinafter referred to as $[\eta]$ is measured at 25° C. with o-chlorophenol as the solvent.

EXAMPLE 1

A diamine of polyethylene oxide having amino groups at both ends was synthesized by cyanoethylation and hydrogenation of a polyethylene glycol which had a number average molecular weight of 4100.

The product was then reacted with an equimolar amount of adipic acid to form a diamine salt, which was mixed with ε-caprolactam at such a ratio that the polyether segment content of the mixture should become a predetermined value. The mixture was heated at 240° C. in a nitrogen atmosphere for a predetermined period, and a polyether-polyamide blockcopolymer was obtained. The copolymer was extracted for 12 hours in 95° C. hot water to be removed of unreacted components. The following eight types of the blockcopolymers were thus obtained.

TABLE 1

| Sample No.: | Polyether segment content (wt. percent) | $\eta r$ |
|---|---|---|
| I | 8 | 2.40 |
| II | 14 | 2.45 |
| III | 20 | 2.43 |
| IV | 32 | 2.47 |
| V | 48 | 2.51 |
| VI | 60 | 2.52 |
| VII | 70 | 2.49 |
| VIII | 85 | 2.54 |

A polyether-polyamide blockcopolymer of which polyether segment content was 90% was prepared in the similar manner. The product, however, was water-soluble and unsuitable for the purpose of this invention. The results of blend-spinning each of the eight copolymers with a polyethylene terephthalate ($[\eta]$=0.65) are shown in Table 2 below. For the spinning, an extruder type machine was employed, and the spinning temperature were as follows: at the cylinder portion, 285–290° C.; at the pump portion, 290–300° C.; and at the spinneret, 285–295° C.

The winding speed was 400 m./min. and the average staying time of the polymer melt in the spining machine was approximately 7 minutes. The resultant undrawn filaments were drawn by approximately 3.5 times using a 70° C. hot pin and 145° C. hot plate in the conventional manner. The properties of the drawn fibers are also shown in Table 2. As can be understood from the same table, according to this invention fibers of excellent antistatic property and dyeability were obtained compared with conventional polyethylene terephthalate fibers.

TABLE 2

| Sample No. of blockcopolymer used | Polyetherpoly-amide blockco-polymer content of fiber (wt. percent) | Polyether segment content of fiber (wt. percent) | Frictionally charged voltage (v.) | Dye absorption (percent) | Properties of drawn fiber | | |
|---|---|---|---|---|---|---|---|
| | | | | | Tenacity (g./d.) | Elongation (percent) | Initial modulus (g./d.) |
| | 0 | 0 | −3,900 | 21.3 | 5.4 | 22.3 | 120.7 |
| V | 0.042 | 0.02 | −3,300 | 21.9 | 5.4 | 21.9 | 123.1 |
| V | 0.104 | 0.05 | −2,400 | 22.3 | 5.4 | 20.1 | 119.7 |
| V | 0.208 | 0.1 | −2,070 | 25.7 | 5.4 | 22.3 | 107.6 |
| V | 1.04 | 0.5 | −1,850 | 30.7 | 5.4 | 21.7 | 101.5 |
| V | 2.08 | 1.0 | −1,730 | 39.3 | 5.4 | 20.3 | 111.3 |
| V | 4.17 | 2.0 | −1,270 | 45.7 | 5.4 | 25.1 | 99.1 |
| V | 10.4 | 5.0 | −470 | 53.1 | 5.3 | 20.7 | 98.7 |
| V | 20.8 | 10.0 | −410 | 70.2 | 4.1 | 22.6 | 91.9 |
| V | 25.0 | 12.0 | −310 | 72.6 | 3.7 | 20.9 | 86.3 |
| V | 41.7 | 20.0 | −230 | 73.2 | 1.3 | 20.6 | 49.7 |
| V | 62.5 | 30.0 | (a) | (a) | (a) | (a) | (a) |
| I | 50.0 | 4.0 | −1,320 | 82.4 | 5.2 | 28.3 | 51.6 |
| II | 28.5 | 4.0 | −1,210 | 62.5 | 5.2 | 19.3 | 81.3 |
| III | 20.0 | 4.0 | −800 | 61.9 | 4.9 | 27.3 | 93.2 |
| IV | 12.5 | 4.0 | −600 | 52.0 | 5.1 | 14.5 | 99.3 |
| V | 8.33 | 4.0 | −670 | 43.7 | 5.0 | 20.1 | 90.7 |
| VI | 6.67 | 4.0 | −710 | 45.6 | 5.1 | 22.7 | 97.7 |
| VII | 5.72 | 4.0 | −1,020 | 44.1 | 3.4 | 20.1 | 99.7 |
| VIII | 4.70 | 4.0 | −1,100 | 40.7 | 2.5 | 19.9 | 101.5 |

(a) Drawing impossible.

Example 2

This example is to demonstrate the effect of the sequence length of the polyether segment in the blockcopolymer on the properties of the product fibers.

The following four polyether-polycapramide blockcopolymers shown in Table 3 were prepared in the similar manner to Example 1.

TABLE 3

| Sample No. | Number average molecular weight of polyethylene oxide | Polyethylene oxide content (wt. percent) | $\eta r$ of blockcopolymer |
|---|---|---|---|
| I | 8,100 | 32 | 2.44 |
| II | 3,900 | 32 | 2.52 |
| III | 2,100 | 32 | 2.63 |
| IV | 1,100 | 32 | 2.68 |

Each of the above polyether-polycapramide blockcopolymer was blended with a polyethylene terephthalate ($[\eta]=0.68$) at a weight ratio of 1:7, and from the mixtures, drawn fibers were prepared in the same manner as employed in Example 1.

The polyether segment content of the fiber was 4 wt. percent.

The properties of the drawn fibers were as shown in Table 4.

TABLE 4

| Blockcopolymer used | Polyetherpoly-amide blockco-polymer content of fiber (wt. percent) | Polyether segment content of fiber (wt. percent) | Frictionally charged voltage (v.) | Dye absorption (percent) | Properties of drawn fiber | | |
|---|---|---|---|---|---|---|---|
| | | | | | Tenacity (g./d.) | Elongation (percent) | Initial modulus (g./d.) |
| I | 12.5 | 4 | −620 | 67.9 | 4.3 | 17.6 | 87.5 |
| II | 12.5 | 4 | −530 | 65.3 | 5.1 | 13.7 | 99.3 |
| III | 12.5 | 4 | −640 | 70.1 | 4.9 | 14.3 | 91.3 |
| IV | 12.5 | 4 | −970 | 72.1 | 5.3 | 17.1 | 98.3 |
| a | 0 | 0 | −3,900 | 21.3 | 6.8 | 20.3 | 121.9 | a Polyethylene terephthalate alone.

Example 3

A diamine of polypropylene oxide having amino groups at both ends was synthesized by cyanoethylation and hydrogenation of a polypropylene oxide which has a number average molecular weight of approximately 5,200.

The diamine was reacted with an equimolar amount of sebacic acid to form a diamine salt, and the salt was mixed with ε-caprolactam at such a ratio to make the propylene oxide segment content of the mixture a predetermined value. The mixture was then heated at 240° C. in a nitrogen atmosphere for a predetermined period to produce a polyetherpolyamide blockcopolymer.

Thus obtained crude blockcopolymer was extracted in 95° C. hot water for 12 hours to be removed of the unreacted components.

The following three types of blockcopolymers were prepared as in the above.

TABLE 5

| Sample No. | Polypropylene oxide segment content (wt. percent) | $\eta r$ |
|---|---|---|
| I | 10.2 | 2.43 |
| II | 20.4 | 2.41 |
| III | 40.6 | 2.46 |

Each of the above three blockcopolymers was blend-spun with a polyethylene terephthalate ($[\eta]=0.70$), and the fibers as shown in Table 6 were obtained. The spinning and drawing were performed in the same manner to Example 1.

TABLE 6

| Blockcopolymer used | Polyetherpoly-amide block copolymer content of fiber (wt. percent) | Polyether segment content of fiber (wt. percent) | Frictionally charged voltage (v.) | Dye absorption (percent) | Properties of drawn fiber | | |
|---|---|---|---|---|---|---|---|
| | | | | | Tenacity (g./d.) | Elongation (percent) | Initial modulus (g./d.) |
| III | 24.6 | 10 | −290 | 59.0 | 2.9 | 22.1 | 90.1 |
| III | 14.8 | 6 | −420 | 50.7 | 2.7 | 27.1 | 101.7 |
| III | 4.9 | 2 | −1,100 | 41.2 | 5.2 | 19.8 | 100.5 |
| III | 4.9 | 2 | −1,100 | 41.2 | 5.2 | 19.8 | 100.5 |
| I | 39.3 | 4 | −1,250 | 62.1 | 4.3 | 20.2 | 67.3 |
| I | 39.3 | 4 | −1,250 | 62.1 | 4.3 | 20.2 | 67.3 |
| II | 19.6 | 4 | −950 | 53.9 | 4.5 | 21.5 | 92.7 |
| III | 9.9 | 4 | −630 | 47.8 | 4.7 | 19.1 | 98.9 |

Example 4

A salt consisting of the diamine of polyethylene oxide (molecular weight:4,200) which was prepared as in Example 1 and adipic acid at an equimolar ratio was mixed with hexamethylene diammonium adipate and polycondensated to produce a polyether-polyamide blockcopolymer whose polyethylene oxide segment content was 32 wt. percent. The blockcopolymer was washed with water and dried similarly to Example 1.

Separately, a poly-p-ethylene-oxybenzoate ($[\eta]=0.65$) was synthesized from p-oxyethoxybenzoic acid.

Each predetermined amount of these two polymers were mixed and spun through an extruder type spinning machine at the temperatures as follows: at the cylinder portion, 250–280° C.; at the pump portion, 260–280° C.; and at the spinneret, 260–285° C. The winding speed was 400 m./min. The average staying time of the melt in the spinning machine was approximately 8 minutes. The undrawn fibers were drawn by 3.6 times with a 75° C. hot pin and 145° C. hot plate. The properties of the drawn fiber are shown in Table 7.

amount of hexamethylenediamine to produce a polycapramide whose end groups were 92% amino groups and molecular weight was 5,200. This polyamide oligomer and a polyethylene terephthalate having a molecular weight of 5,500 were melt-blended within a short time at a weight ratio of 1:1. The mixture was pulverized and reacted in solid phase at 200° C. under 1 mm. Hg for 16 hours. The reaction mixture had an $[\eta]$ of 0.73.

The amount of addition of this polyester-polyamide blockcopolymer was varied in each run. The spinning was performed through an extruder type spinning machine. The undrawn filaments were drawn with a 70° C. hot pin and 140° C. hot plate by approximately 3.5 times in the conventional manner. The properties of the resultant fibers are shown in Table 9 below.

TABLE 9

| Polyether polyamide blockcopolymer used | Blend ratio (wt.) BPEA/BPEsA/PET | Polyether segment content (wt. percent) | Content of polyester polyamide blockcopolymer (wt. percent) | U percent of undrawn filament (percent) | Frictionally charged voltage (v.) | Properties of drawn fiber ||| |
|---|---|---|---|---|---|---|---|---|
| | | | | | | Tenacity (g./d.) | Elongation (percent) | Initial mobulus (g./d.) |
| I | 15/20/65 | 5.0 | 20 | 1.3 | −490 | 5.3 | 14.0 | 97.1 |
| II | 20/10/70 | 5.0 | 10 | 1.3 | −570 | 5.6 | 12.1 | 91.9 |
| III | 22.5/5/72.5 | 5.0 | 5 | 1.5 | −720 | 4.7 | 11.4 | 89.3 |
| IV | 25/0/75 | 5.0 | 0 | 1.7 | −740 | 4.1 | 14.7 | 99.3 |
| | 0/0/100 | 0.0 | 0 | 0.8 | −3,900 | 6.3 | 19.8 | 127.1 | a BPEA=polyether-polyamide blockcopolymer; BPEsA=polyester-polyamide blockcopolymer; PET=polyethylene terephthalate.

Example 6

Modified polyethylene terephthalate were obtained by stirring a polyethylene terephthalate ($[\eta]=0.66$) with a polycapramide ($\eta r=2.0$) of which 93% of the end groups was amino groups, at 280° C. under a reduced pressure of

TABLE 7

| | Polyetherpolyamide blockcopolymer content of fiber (wt. percent) | Polyether segment content of fiber (wt. percent) | Frictionally charged voltage (v.) | Dye absorption (percent) | Properties of drawn fiber ||| |
|---|---|---|---|---|---|---|---|
| | | | | | Tenacity (g./d.) | Elongation (percent) | Initial modulus (g./d.) |
| No. | | | | | | | |
| 1 | 50.0 | 16 | −230 | 80.3 | 2.1 | 23.7 | 49.3 |
| 2 | 25.0 | 8 | −370 | 78.7 | 4.2 | 16.5 | 56.5 |
| 3 | 12.5 | 4 | −520 | 69.1 | 5.7 | 12.3 | 65.3 |
| 4 | 6.25 | 2 | −1,200 | 52.3 | 5.5 | 19.7 | 79.7 |

Example 5

Four polyether-polycapramide blockcopolymers of each different polyethylene oxide content were prepared in the similar manner as described in Example 1. Their properties are shown in Table 8.

TABLE 8

| | Sequence length of polyether segment | Polyether segment content (wt. percent) | $\eta r$ |
|---|---|---|---|
| Sample No.: | | | |
| I | 4,000 | 33.3 | 2.55 |
| II | 4,000 | 25.0 | 2.53 |
| III | 4,000 | 22.2 | 2.56 |
| IV | 4,000 | 20.0 | 2.59 |

Those blockcopolymers were blend-spun with a polyethylene terephthalate ($[\eta]=0.66$). Addition of a minor amount of polyester-polyamide blockcopolymer in that occasion improved the spinnability. Furthermore, the polyester-polyamide blockcopolymer was prepared as follows:

ε-Caprolactam, was polymerised with a predetermined 1 mm. Hg for 30 minutes. Their properties were as given in Table 10.

TABLE 10

| | Content of polyamide content (wt. percent) | $[\eta]$ of the product |
|---|---|---|
| Sample No.: | | |
| I | 20 | 0.73 |
| II | 10 | 0.71 |

Separately, a polyether-polycapramide blockcopolymer ($\eta r=2.53$), of which polyether segment content was 49.6% was prepared in the similar manner to Example 1. This was used as the sample No. III.

The sample No. III was blend-spun with each of the modified polyethylene terephthalates (I and II). The resultant filaments were heat-drawn in the conventional manner. The properties of the drawn fibers are shown in Table 11.

TABLE 11

| Modified PET used | Content of polyether-polycapramide blockcopolymer (wt. percent) | Content of each component in the fiber (wt. percent) ||| Frictionally charged voltage (v.) | Frictionally charged voltage after 10 washings a (v.) | Dye absorption (percent) | Properties of drawn fiber ||| |
|---|---|---|---|---|---|---|---|---|---|---|
| | | Ester | Amide | Ether | | | | Tenacity (g./d.) | Elongation (percent) | Initial modulus (g./d.) |
| I | 4 | 77 | 21 | 2 | −1,070 | −1,090 | 65 | 6.1 | 13.1 | 93 |
| II | 4 | 86 | 12 | 2 | −1,210 | −1,100 | 51 | 7.5 | 12.3 | 107 | a Washing condition: 30 minutes' washing in 50° C. water.

Example 7

Four parts of the polyether-polyamide blockcopolymer (III) employed in Example 6, 70 parts of a polyethylene terephthalate (PET) having an $[\eta]$ of 0.66, 20 parts of a polycapramide (N–6) having a $\eta r$ of 2.45, 6 parts of the polyester-polyamide block copolymer (BPEsA) employed in Example 5, and 20 p.p.m. of copper acetate were blended in a rotary blender, and thereafter the blend was spun through an extruder type spinning machine. The U percent of the undrawn filaments was 1.9% as shown in Table 12 below, indicating that the spinning was good and the denier unevenness was low. The undrawn filaments were heat-drawn in the conventional manner, to produce the fibers of which properties are shown in Table 12. As a control, cases wherein the use of the polyether-polycapramide and/or polyester-polyamide were omitted were also given in the same table.

TABLE 12

| Blend ratio III/PET/BPEsA/N-6 | U percent of undrawn filament | Frictionally charged voltage (v.) | Dye absorption (percent) | Properties of drawn fiber | | |
|---|---|---|---|---|---|---|
| | | | | Tenacity (g./d.) | Elongation (percent) | Initial modulus (g./d.) |
| 4/70/6/20 | 1.9 | −1,030 | 67 | 5.3 | 13.7 | 95.9 |
| 0/72/6/22 | 2.3 | −2,700 | 62 | 6.1 | 11.9 | 102.3 |
| 4/73/0/23 | 2.5 | −1,150 | 61 | 3.7 | 12.1 | 96.5 |
| 0/70/0/30 | 9.1 | −3,000 | 57 | 3.1 | 19.3 | 93.2 |

Example 8

Five parts of the polyether-polycapramide blockcopolymer IV which was synthesized in Example 5, 90 parts of a polyethylene terephthalate ($[\eta]=0.66$) and 5 parts of the polymer specified in Table 13, which was differed in each run, were spun through an extruder-type spinning machine. The undrawn filaments were heat-drawn in the conventional manner. The properties of the drawn fibers are given in Table 13.

TABLE 13

| Added polymer | | U percent of undrawn filament | Frictionally charged voltage (v.) | Dye absorption (percent) | Properties of drawn fiber | | |
|---|---|---|---|---|---|---|---|
| Type | Molecular weight | | | | Tenacity (g./d.) | Elongation (percent) | Initial modulus (g./d.) |
| Polyethylene adipate | 16,300 | 3.5 | −1,800 | 68.5 | 4.1 | 22.0 | 87.2 |
| Polypropylene | 26,300 | 4.2 | −1,920 | 39.6 | 3.2 | 23.1 | 97.9 |
| Polystyrene | 1 50,000 | 4.7 | −1,650 | 45.2 | 3.1 | 19.8 | 107.0 |
| | | 4.2 | −2,010 | 37.0 | 3.7 | 27.1 | 111.0 |

1 Approximately.

Example 9

Four parts of the polyether-polycapramide block-copolymer III used in Example 6 and 96 parts of a polyethylene terephthalate ($[\eta]=0.73$) were blended by means of an extruder and formed into chips. This blend chips as the component A was supplied into a composite spinning machine through a hopper, and from the other hopper a polyethylene terephthalate ($[\eta]=0.73$) was supplied into the same machine. By varying the supply ratios, skin-core type composite filaments of various composite ratios were obtained. The core consisted of the polyethylene terephthalate, and the skin consisted of the component A. The undrawn filaments were heat-drawn in accordance with the usual practice. The properties of the drawn fibers are shown in Table 14.

TABLE 14

| Composite ratio (weight) A/PET | Polyether segment content (wt. percent) | Frictionally charged voltage (v.) | Properties of drawn fiber | | |
|---|---|---|---|---|---|
| | | | Tenacity (g./d.) | Elongation (percent) | Initial modulus (g./d.) |
| 30/70 | 0.6 | −1,260 | 5.3 | 23.0 | 125 |
| 40/60 | 0.8 | −1,190 | 5.1 | 22.1 | 123 |
| 50/50 | 1.0 | −970 | 3.9 | 27.1 | 117 |

Example 10

Twenty parts of the polyether-polycapramide blockcopolymer II used in Example 5 and 80 parts of a polyethylene terephthalate ($[\eta]=0.66$) were blended by an extruder and formed into chips. This was used as the component A.

Separately, 80 parts of a polyethylene terephthalate ($[\eta]=0.66$) and 20 parts of a polycapramide ($\eta r=1.98$) of which end groups were 87% amino groups were blended by an extruder and formed into chips. The chips were then heated at 200° C. under 1 mm. Hg for 16 hours, to be converted into a polyester-polyamide blockcopolymer. This was used as the component B.

The A and B were supplied into a composite spinning machine separately through two hoppers and spun through a side-by-side type spinneret to provide a side-by-side composite filament. The undrawn filaments were heat drawn in accordance with the usual practice. The properties of the drawn fibers are shown in Table 15.

TABLE 15

| Composite ratio weight A/B | Polyether segment content (wt. percent) | Frictionally charged voltage (v.) | Properties of drawn fiber | | |
|---|---|---|---|---|---|
| | | | Tenacity (g./d.) | Elongation (percent) | Initial modulus (g./d.) |
| 70/30 | 3.5 | −630 | 3.5 | 27.1 | 92.1 |
| 50/50 | 2.5 | −910 | 4.1 | 28.1 | 93.7 |
| 30/70 | 1.5 | −1,250 | 4.9 | 17.6 | 97.1 |

When the fibers were treated in boiling water, crimps were developed therein. The properties of the crimped fibers are shown in Table 16.

TABLE 16

| Composite ratio A/B | Properties of crimped fiber | | Dye absorption (percent) | Crimp recovery (percent) | Number of convolution (per 25 mm.) | Percentage crimp (percent) |
|---|---|---|---|---|---|---|
| | Tenacity (g./d.) | Elongation (percent) | | | | |
| 70/30 | 2.9 | 32.1 | 52.0 | 87.1 | 43 | 65 |
| 50/50 | 3.6 | 33.9 | 56.3 | 81.5 | 53 | 81 |
| 30/70 | 3.8 | 29.6 | 47.3 | 89.3 | 49 | 59 |

EXAMPLE 11

A diamine of polypropylene oxide having amino groups at both ends was prepared by cyanoethylation and hydrogenation of a polypropylene oxide which had a number average molecular weight of 4,900.

The diamine was reacted with an equimolar amount of terephthalic acid to form a diamine salt. Seventy parts of this salt was blended with 30 parts of ε-caprolactam, and the mixture was heated at 247° C. in a nitrogen atmosphere for 8 hours, and converted into a polyether-polyamide blockcopolymer. The unreacted components in the crude copolymer were removed by 95° C. hot water extraction. The remaining copolymer had a $\eta r$ of 2.48, and a propylene oxide segment content of 65.4 wt. percent.

Two parts of this copolymer and 98 parts of a polyethylene terephthalate ($[\eta]=0.65$) were blended and formed into pellets by means of an extruder.

The pellet was extruded through a slit-formed spinneret of a melt-film-molding machine to form a 0.5 mm. film sheet.

The film was subjected to frictions with wool, but thereafter no fine dust such as tobacco ash adhered thereto. In contrast, ash was collected readily on conventional polyethylene terephthalate film.

What is claimed is:

1. A blended composition for melt-shaping which comprises (I) a film-forming linear benzene ring containing polyester and (II) a polyether-polyamide blockcopolymer prepared by the polycondensation reaction of:
   (A) a polyamide-forming monomer selected from
      (a) lactams of the formula:

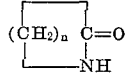

wherein $n$ is an integer of from 5–11.
      (b) ω-amino acids of 5–11 carbon atoms and
      (c) aliphatic or aromatic diamines combined with aliphatic or aromatic dicarboxylic acids; or
   (B) a polyamide oligomer in which the terminal groups of said oligomer are selected from:
      (i) carboxyl groups;
      (ii) amino groups; and
      (iii) mixtures of (i) and (ii) in the presence of
   (C) a polyether having terminal groups selected from
      (iv) carboxyl groups
      (v) organic amine salts of said carboxyl salts of (iv)
      (vi) amino groups, and
      (vii) organic acid salts of said amino groups of (vi);

with the proviso that all of the terminal groups of (B) and (C) are not the same, said blockcopolymer containing from 20 to 85% by weight of the polyether segment, said polyether segment comprising from 0.05 to 20% by weight based on the total weight of said polyester and blockcopolymer.

2. The composition of claim 1 in which said polyseter is derived from terephthalic acid and said blockcopolymer derived from polyethylene glycol and polycapramide.

3. The composition of claim 1 wherein said polyester is polyethylene terephthalate.

4. The composition of claim 1 wherein said polyester comprises a polyester-polyamide blockcopolymer composed of at least 70 parts of polyethylene terephthalate and at most 30 parts of polycapramide.

5. The composition of claim 1 wherein the polyether segment comprises from 0.05–10% by weight based on the total weight of the polyester and the blockcopolymer.

References Cited

UNITED STATES PATENTS 3,384,681   5/1968   Kobayashi _____ 260—857

FOREIGN PATENTS 1,484,108   9/1967   France.

SAMUEL H. BLECH, Primary Examiner

P. LIEBERMAN, Assistant Examiner

U.S. Cl. X.R.

260—78, 47